(12) United States Patent
Kim et al.

(10) Patent No.: US 11,837,220 B2
(45) Date of Patent: Dec. 5, 2023

(54) APPARATUS AND METHOD FOR SPEECH PROCESSING USING A DENSELY CONNECTED HYBRID NEURAL NETWORK

(71) Applicants: Electronics and Telecommunications Research Institute, Daejeon (KR); The Trustees of Indiana University, Indianapolis, IN (US)

(72) Inventors: Minje Kim, Indianapolis, IN (US); Mi Suk Lee, Daejeon (KR); Seung Kwon Beack, Daejeon (KR); Jongmo Sung, Daejeon (KR); Tae Jin Lee, Daejeon (KR); Jin Soo Choi, Daejeon (KR); Kai Zhen, Indianapolis, IN (US)

(73) Assignees: Electronics and Telecommunications Research Institute, Daejeon (KR); The Trustees of Indiana University, Indianapolis, IN (US)

( * ) Notice: Subject to any disclaimer, the term of this patent is extended or adjusted under 35 U.S.C. 154(b) by 289 days.

(21) Appl. No.: 17/308,800

(22) Filed: May 5, 2021

(65) Prior Publication Data

US 2021/0350796 A1    Nov. 11, 2021

(30) Foreign Application Priority Data

May 7, 2020    (KR) .................. 10-2020-0054733

(51) Int. Cl.
*G10L 15/16*    (2006.01)
*G06F 17/15*    (2006.01)
*G06N 3/045*    (2023.01)

(52) U.S. Cl.
CPC .............. *G10L 15/16* (2013.01); *G06F 17/15* (2013.01); *G06N 3/045* (2023.01)

(58) Field of Classification Search
CPC ........ G06F 17/15; G06N 3/044; G06N 3/045; G06N 3/08; G10L 15/16; G10L 21/0208; G10L 21/0224; G10L 25/30
See application file for complete search history.

(56) References Cited

U.S. PATENT DOCUMENTS

| 10,249,294 B2 | 4/2019 | Kim et al. |
| 10,319,374 B2 | 6/2019 | Catanzaro et al. |
| 2018/0268739 A1 | 9/2018 | Chung et al. |

FOREIGN PATENT DOCUMENTS

| JP | 2019109306 A | 7/2019 |

OTHER PUBLICATIONS

T.-A. Hsieh, H.-M. Wang, X. Lu and Y. Tsao, "WaveCRN: An Efficient Convolutional Recurrent Neural Network for End-to-End Speech Enhancement," in IEEE Signal Processing Letters. Apr. 12, 2020 (Year: 2020).*

(Continued)

*Primary Examiner* — Daniel C Washburn
*Assistant Examiner* — Athar N Pasha
(74) *Attorney, Agent, or Firm* — William Park & Associates Ltd.

(57) ABSTRACT

Disclosed is a speech processing apparatus and method using a densely connected hybrid neural network. The speech processing method includes inputting a time domain sample of N*1 dimension for an input speech into a densely connected hybrid network; passing the time domain sample through a plurality of dense blocks in a densely connected hybrid network; reshaping the time domain samples into M subframes by passing the time domain samples through the plurality of dense blocks; inputting the M subframes into gated recurrent unit (GRU) components of N/M-dimension;

(Continued)

outputting clean speech from which noise is removed from the input speech by passing the M subframes through GRU components.

18 Claims, 5 Drawing Sheets

(56) References Cited

OTHER PUBLICATIONS

Casebeer, Jonah, Brian Luc, and Paris Smaragdis. "Multi-view networks for denoising of arbitrary numbers of channels." 2018 16th International Workshop on Acoustic Signal Enhancement (IWAENC). IEEE, 2018. (Year: 2018).*

Tan, Ke, and DeLiang Wang. "A convolutional recurrent neural network for real-time speech enhancement." Interspeech. vol. 2018. 2018. (Year: 2018).*

Kang, Jian, Wei-Qiang Zhang, and Jia Liu. "Gated recurrent units based hybrid acoustic models for robust speech recognition." 2016 10th International Symposium on Chinese Spoken Language Processing (ISCSLP). IEEE, 2016. (Year: 2016).*

Tan, Ke, Jitong Chen, and DeLiang Wang. "Gated residual networks with dilated convolutions for monaural speech enhancement." IEEE/ACM transactions on audio, speech, and language processing 27.1 (2018): 189-198. (Year: 2018).*

Gao Huang et al., Densely Connected Convolutional Networks, arXiv:1608.06993v5, Jan. 28, 2018.

Kai Zhen et al., A Dual-Staged Context Aggregation Method Towards Efficient End-to-End Speech Enhancement, ICASSP, Feb. 6, 2020, Barcelona, Spain.

Kai Zhen et al., Efficient Context Aggregation for End-to-End Speech Enhancement Using a Densely Connected Convolutional and Recurrent Network, 2019 IEEE Workshop on Applications of Signal Processing to Audio and Acoustics, Oct. 20-23, 2019, New Paltz, NY.

Kyu J. Han et al., 'Densely Connected Networks for Conversational Speech Recognition', Interspeech 2018, Sep. 2, 2018, pp. 796-800, Hyderabad, India.

Naoya Takahashi et al., 'Mmdenselstm: An Efficient Combination of Convolutional and Recurrent Neural Networks for Audio Source Separation', IWAENC 2018, Sep. 2018, pp. 106-110, Tokyo, Japan.

Yaxing Li et al., 'Densely Connected Network With Time-Frequency Dilated Convolution for Speech Enhancement', ICASSP 2019, Date Added to IEEE Xplore: Apr. 17, 2019, pp. 6860-6864, China.

* cited by examiner

1: Input: $N$ samples from the noisy utterance, $x$
2: Output: The last $M/N$ samples of the denoised signal, $\hat{s}$
3: DenseNet denoising: $X^{(L)} \leftarrow \mathcal{D}(x; W^{CNN})$
4: Reshaping: $\bar{X}^{(L)} \leftarrow [X^{(L)}_{1:N/M}, X^{(L)}_{N/M+1:2N/M}, \ldots,$
5: $\qquad\qquad\qquad X^{(L)}_{N-N/M+1:N}]$
6: GRU denoising: $\hat{s} \leftarrow \mathcal{G}(\bar{X}^{(L)}; W^{RNN})$
7: Post windowing: $\hat{s} \leftarrow \text{Hann}(\hat{s})$

FIG. 5

| Components | Input shape | Kernel shape | Output shape |
|---|---|---|---|
| Change channel | (1024, 1) | (55, 1, 32) | (1024, 32) |
| DenseNet | (1024, 32) | (5, 32, 32)<br>(5, 64, 32)<br>(55, 96, 32)† ×4<br>(5, 128, 32)<br>(5, 160, 32) | (1024, 32) |
| Change channel | (1024, 32) | (55, 32, 1) | (1024, 1) |
| Reshape | (1024, 1) | - | (4, 256, 1) |
| GRU | (4, 256, 1) | (256+32, 32)×3<br>(32+256, 256)×3 | (256, 1) |

APPARATUS AND METHOD FOR SPEECH PROCESSING USING A DENSELY CONNECTED HYBRID NEURAL NETWORK

CROSS-REFERENCE TO RELATED APPLICATION

This application claims the benefit of Korean Patent Application No. 10-2020-0054733, filed on May 7, 2020, in the Korean Intellectual Property Office, the disclosure of which is incorporated herein by reference.

BACKGROUND

1. Field of the Invention

The present invention relates to a speech processing apparatus and method using a densely connected hybrid neural network.

2. Description of the Related Art

Monaural speech enhancement can be described as a process of extracting a target speech signal by suppressing background interference in a speech mixture in a single microphone setup.

There have been various classic methods, such as spectral subtraction, Wiener-filtering and non-negative matrix factorization, to remove the noise without leading to objectionable distortion or adding too much artifacts, such that the denoised speech is of decent quality and intelligibility.

Recently, a deep neural network (DNN), a data-based computing paradigm, has been widely used due to its strong parameter estimation capacity and its promising performance. DNN formulates monaural speech enhancement by mask estimation or end-to-end mapping. For mask estimation, DNN usually takes acoustic features in time-frequency (T-F) domain to estimate a T-F mask, such as ideal binary mask (IBM), ideal ratio mask (IRM) and phase-sensitive mask (PSM). Recently, end-to-end speech enhancement DNN gains attention as it takes noisy speech and outputs the denoised signal in time-domain directly, without any feature engineering.

In both mask estimation and end-to-end mapping DNNs, dilated convolution serves a critical role to aggregate contextual information with the enlarged receptive field. Gated residual network (GRN) employs dilated convolutions to accumulate context in temporal and frequency domains, leading to a better performance than a long short-term memory (LSTM) cell-based model. In end-to-end setting, WaveNet and its variations also run-on dilated convolution to give competitive results in speech enhancement and speech coding.

For real-time systems deployed in resource-constrained environment, however, oversized receptive fields from dilated convolution can cause a severe delay issue. Although causal convolution can enable real-time speech denoising, it performs less well comparing to the dilated counterpart. Besides, when the receptive field is too large, the amount of padded zeroes in the beginning of the sequence and a large buffer size for online processing can be a burdensome spatial complexity for a small device, too.

Meanwhile, recurrent neural networks (RNN) can also aggregate context by using recurrent model architectures, which enables a frame-by-frame processing without relying on the large receptive field. However, the responsiveness of a practical RNN system, such as LSTM, comes at the cost of increased model parameters, which are neither as easy to train nor resource-efficient.

SUMMARY

An aspect provides a sound event detection method comprising inputting a time domain sample of N*1 dimension for an input speech into a densely connected hybrid network; passing the time domain sample through a plurality of dense blocks in a densely connected hybrid network; reshaping the time domain samples into M subframes by passing the time domain samples through the plurality of dense blocks; inputting the M subframes into gated recurrent unit (GRU) components of N/M-dimension; outputting clean speech from which noise is removed from the input speech by passing the M subframes through GRU components, wherein the densely connected hybrid network is combination a convolutional neural network (CNN) and a recurrent neural network (RNN).

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

Hereinafter, the example embodiments will be described described in detail with reference to the accompanying drawings.

Figure 1:
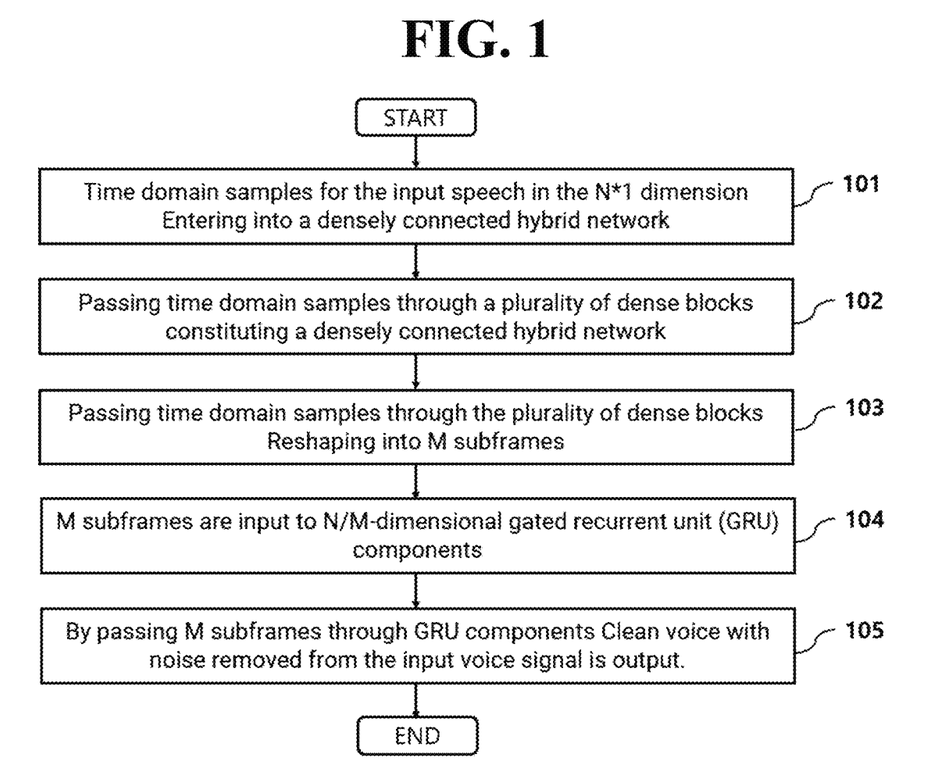
FIG. 1 is a flowchart showing a speech processing method according to an embodiment of the present invention.

FIG. 1 is a flowchart showing a speech processing method according to an embodiment of the present invention.

To leverage the benefit from temporal contextual aggregation, but with a low delay and complexity in the end-to-end setting, a densely connected convolutional and recurrent network (DCCRN) is suggested, which conducts dual-level context aggregation.

The first level of context aggregation in DCCRN is done by a dilated 1D convolutional network component, with a DenseNet architecture [20], to extract the target speech from the noisy mixture in the time domain. It is followed by a compact gated recurrent unit (GRU) component [21] to further leverage the contextual information in the "many-to-one" fashion.

Note that the present application employ a cross-component identical shortcut linking the output of DenseNet component to the output of GRU component to reduce the complexity of the GRU cells. To better tune our heterogeneous neural network components, a component wise training scheme specially designed for DCCRN is proposed. The proposed speech processing method represents that the hybrid architecture of dilated CNN and GRU in DCCRN consistently helps outperform the CNN variations with only one level of context aggregation. In terms of model complexity, the proposed speech processing method is computationally efficient even with the additional GRU layers. The delay is down to 0.016 second for the potential in real-time scenarios, with a potential "cold start" period of 0.048 second (i.e., the maximum lookback size).

Referring to FIG. 1, a process of removing noise of an input speech using DCCRN will be described.

In step 101, the speech processing apparatus may input a time domain sample of an N*1 dimensional input speech to the densely connected hybrid network. Here, the densely connected hybrid network may be a network in which a convolution neural network (CNN) and a recurrent neural network (RNN) are combined.

The densely connected hybrid network may include a plurality of dense blocks. And, each of the dense blocks may be composed of a plurality of convolutional layers.

And, the time domain sample of the N*1 dimension is extended to convolutional layers of the N*D dimension to the N*MD dimension. In this case, each of the convolutional layers of the N*D dimension to the N*MD dimension may be connected. D denotes an expansion rate, and M may be the number of convolutional layers constituting the dense block.

In step 102, the speech processing apparatus may pass the time domain samples through a plurality of dense blocks constituting a densely connected hybrid network.

Each of the plurality of dense blocks included in the densely connected hybrid network may be represented as a repetitive neural network due to having the same convolutional layers with each other. In addition, each of the dense blocks may output a data tensor in the form of a combination of features and channels by performing a 1D convolution operation. Meanwhile, each of the dense blocks may perform a 1D convolution operation or an extended convolution operation according to the expansion rate.

In step 103, the speech processing apparatus may reshape the time domain samples into M subframes by passing the time domain samples through a plurality of dense blocks.

In step 104, the speech processing apparatus may input M subframes into N/M-dimensional gated recurrent unit (GRU) components. The output of the last dense block of the densely connected hybrid network may be reshaped into M subframes. In addition, the reshaped M subframes may be input to N/M-dimensional GRU components.

The GRU components may enhance speech by mixing the first hidden state and the second hidden state using the update gate. Here, the second hidden state may be determined using a linear combination of an input of the GRU component and a first hidden state that is a gated previous hidden state.

In step 105, the speech processing apparatus may output a clean speech from which noise is removed from the input speech by passing M subframes through the GRU components.

Figure 2:
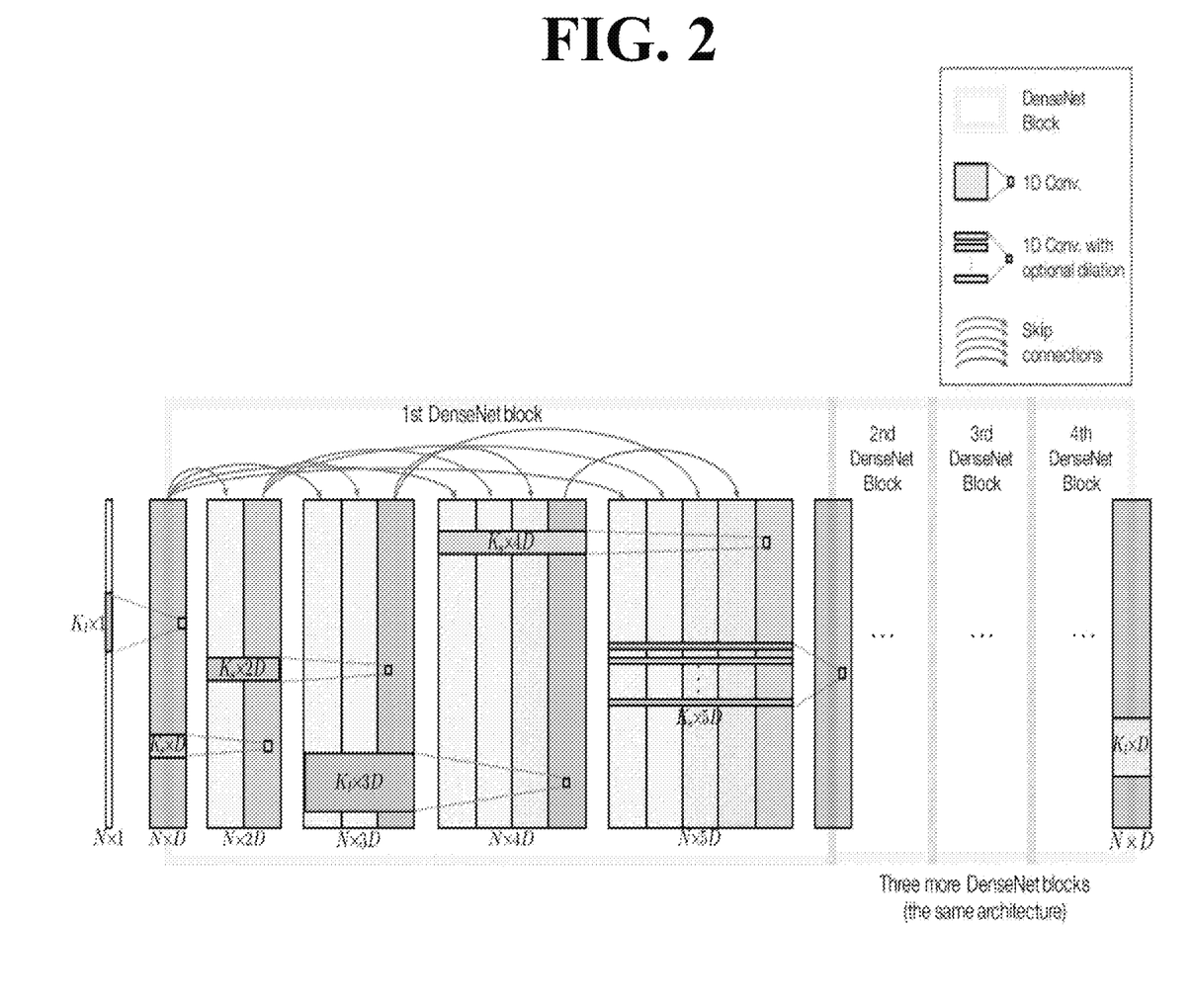
FIG. 2 is a diagram illustrating a DCCRN including Dilated DenseNet according to an embodiment of the present invention.
Figure 3:
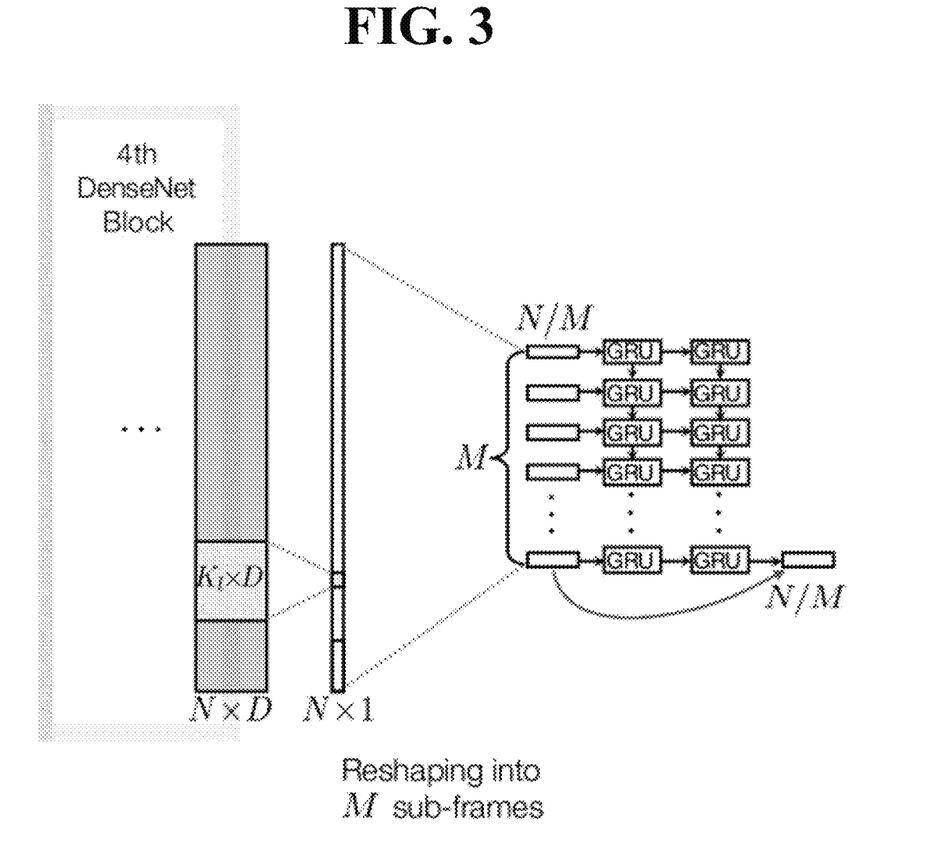
FIG. 3 is a diagram illustrating a DCCRN connecting a fourth DenseNet of FIG. 2 and a GRU component.

FIG. 2 is a diagram illustrating a DCCRN including Dilated DenseNet according to an embodiment of the present invention. FIG. 3 is a diagram illustrating a DCCRN connecting a fourth DenseNet of FIG. 2 and a GRU component.

<Context Aggregation with Dilated DenseNet>

When tuning a deep convolutional neural network (CNN), residual learning is an important technique for solving the gradient vanishing problem. So, deep CNN achieves high performance with low model complexity. ResNet enables residual learning by adding the same short cut to the bottle-neck structure.

Although the bottleneck structure includes a direct path to feedforward information from an early layer to a later layer, it does not extend the full capacity of the information flow. Therefore, ResNet is sometimes accompanied by gating mechanisms, a technique heavily used in the RNNs, such as LSTM or GRU, to further facilitate the gradient propagation in convolutional network.

In comparison, DenseNet resolves the above problem by relying on the same shortcuts. The dense block differs from the bottleneck structure in that each layer concatenates the output from all preceeding layers as its input, while it feeds its own output to all subsequent layers. Due to the density skip connection. DenseNet tends to require fewer model parameters to achieve more competitive performance.

In a fully convolutional architecture, a dilated convolution is a technique that expands the receptive field to cover long sequences and shows excellent performance in speech enhancement as well. As the CNN's model complexity is lower, extended convolution is considered an inexpensive alternative to recurrence operations. The speech processing method is method to adopt with a receptive field size that does not exceed the frame size.

In the present invention, $\mathcal{F}^{(l)}$ denotes a convolution operation between an input $X^{(l)}$ and a filter $H^{(l)}$ in the l-th layer, which $\gamma^{(l)}$ is a dilation rate. When there is no expansion, the default value of the dilation rate $\gamma^{(l)}$ is 1.

$$X^{(l+1)} \leftarrow \mathcal{F}^{(l)}(X^{(l)}, H^{(l)}, \gamma^{(l)}) \qquad \text{<Equation 1>}$$
$$X^{(l-1)}_{\tau,d} = \sum_{n+k\gamma^{(l)}=\tau} X^{(l)}_{n,d} H^{(l)}_{k,d'}$$

In Equation 1, n, τ, d, k denotes an input feature, an output feature, channels, and filter coefficients, respectively. k is an integer that satisfies k≤⌊K/2⌋, and K is the 1D kernel size. In the speech processing method, two kernel sizes of $K_s$≅5 and $K_f$=55 are proposed, for example.

The DCCRN proposed in the present invention is based on 1D convolution, and a tensor is in the form of a product of a feature and a channel ((features)×(channels)).

The speech processing method uses zero padding to maintain the number of features in the same cross layers. A specific convolution, such as the second equation in Equation 1, activates an dilated convolution with a selection of $\gamma^{(l)}$>1.

In DCCRN, a dense block combines five convolutional layers as shown in FIG. 2. The input of the l-th layer in each dense block is a channel-wise concatenated tensor of all previous feature maps in the same dense block.

$$X^{l+1} \leftarrow \mathcal{F}^{(l)}([X^{(l)}, X^{(l-1)}, \ldots, X^{(l_b)}], H^{(l)}, \gamma^{(l)}) \qquad \text{<Equation 2>}$$

Here, $X^{(l_b)}$ denotes the first input feature mapped to the b-th block. DensNet architecture $H^{(l)}$ grows according to $H^{(l)} \in \mathbb{R}^{K \times (l-l_b+1)D}$ having a growth rate D and depth $X^{(l_b)}$.

In the last layer of the dense block, the concatenated input channels collapse down to D, which forms the input to the next block. The first dense block in FIG. 2 represents this process. According to an embodiment of the present invention, the speech processing method stacks four dense blocks with the dilation rate of the last layer in each block to be 1, 2, 4 and 8, respectively. Unlike the original DenseNet architecture, there is no transition between dense blocks in the present invention. In the present invention, one dense block for the first layer is expanded to a channel N×D using time domain samples N×1, and the other dense block for the first layer is reduced to one channel again after the stacked dense blocks. This forms the final output of the complete convolutional DenseNet baseline. In all convolutional layers, the present invention uses ReLU as the activation function.

<Context Aggregation with Gated Recurrent Network>

The LSTM and GRU as RNN variants are used for speech enhancement due to their sequence modeling capacity facilitated by the invention of memory cells and various gates. The DCCRN selects GRU components with reduced computational complexity compared to LSTM. The information flow in each GRU component is represented as in Equation 3.

$$h(t)=(1-z(t))\odot h(t-1)+z(t)\odot \tilde{h}(t)$$
$$\tilde{h}(t)=\tan h(W_h x(t)+U_h(r(t)\odot h(t-1)))$$
$$z(t)=\sigma(W_z x(t)+U_z h(t-1))$$
$$r(t)=\sigma(W_r x(t)+U_r h(t-1)), \qquad \text{<Equation 3>}$$

Where t is the index of the sequence. h and $\tilde{h}$ are the hidden state and the newly proposed state. h and $\tilde{h}$ are mixed by the update gate Z in a complementary manner as in the first equation of equation 3. The GRU cell calculates the tan h unit $\tilde{h}$ using a linear combination of the input X and the gated previous hidden state h according to the second equation of Equation 3.

Similarly, gates are estimated using different sigmoid units, such as the third and fourth equations of Equation 3. In all linear operations, GRU uses the corresponding weight matrices $W_h$, $W_z$, $W_r$, $U_h$, $U_z$, $U_r$, but the bias term is omitted.

The GRU component follows a "many-to-one" mapping style for an additional level of context collection. During training, it looks back the Mth time step and produces an output corresponding to the last time step. To this end, DCCRN reshapes the N×1 vector, which is the output of the CNN part, into M subframes. Each of the M subframes is an N/M dimensional input vector for a GRU cell. The DCCRN described in the present invention has two GRU layers. One GRU layer has 32 hidden units, and the other has N/M units, which are the output dimensions of the system.

In addition, in order to facilitate optimization and limit the model complexity of the GRU layer, the present invention passes the output of the last N/M subframe of the DenseNet component to the output of the GRU component through a skipping connection. The noise-removed speech is the sum of the outputs of the DenseNet component and the GRU component. With a well-tuned DenseNet, output close to clear speech may be obtained, and the work of optimizing GRU components can be reduced.

Figure 4:
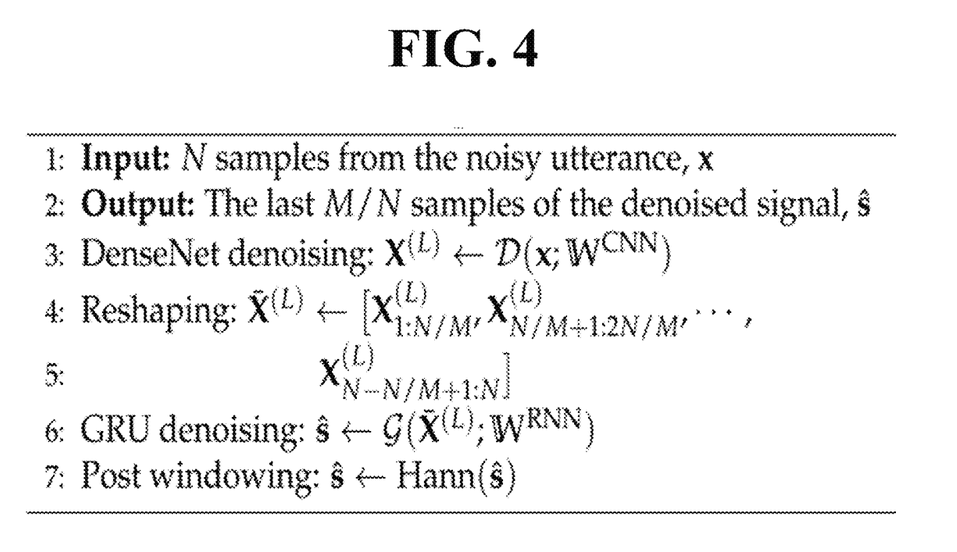
FIG. 4 is a process for explaining a feed forward procedure in DCCRN according to an embodiment of the present invention.

FIG. 4 is a process for explaining a feed forward procedure in DCCRN according to an embodiment of the present invention.

<Data Flow>

During training, the noise signal is first fed to the DenseNet component D (x; $W^{CNN}$) as shown in FIG. 2 (third row in FIG. 4). It means that L consecutive convolutional layers may be grouped into 4 dense blocks.

If the dense blocks are not related to GRU layers, the DenseNet component may take N samples of the noise signal and predict the last N/M clean speech sample for which the loss is calculated. Since the first N−N/M output samples or future samples are not considered, this process may be viewed as a causal convolution process. Instead, to accommodate the GRU layers, the DCCRN training procedure generates an N/M dimensional vector ($\overline{X}^{(L)} \in \mathbb{R}^{N/M \times M}$) using all N samples from the CNN part.

As a result, final GRU hidden states, which is a matching the N/M dimensional vector, may generate an output cleanup signal $\hat{S}$. During the test time, the GRU layers may select an N/M-dimensional subframe at a given time and predict an output cleanup signal $\hat{S}$. Each of input sub-frames for the GRU layer is the result of the stacked dense blocks with a receptive field of up to N past samples.

Figure 5:
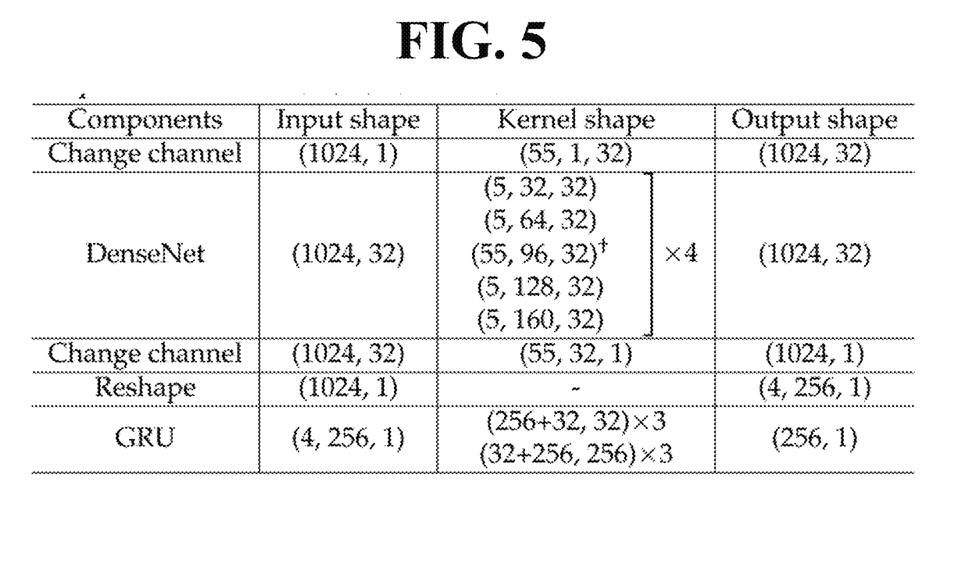
FIG. 5 is a diagram illustrating an output shape derived through each component according to an embodiment of the present invention.

FIG. 5 is a diagram illustrating an output shape derived through each component according to an embodiment of the present invention.

<Objective Function>

The objective function is based on the mean squared error (MSE), but the present invention may improve the objective function using an additional perceptual term. MSE alone cannot measure perceptual quality and intelligibility. To this end, the MSE may either accept a psychoacoustic weighting scheme or be replaced by a clearly salient measure such as short-time objective intelligibility (STOI), but an differentiable objective function. Does not exist.

In the present invention, the objective function is based on the MSE having normalization comparing the Mel-Spectra of the target and the output signal.

$$\varepsilon(s\|\hat{s}) = \text{MSE}(s\|\hat{s}) + \lambda \text{MSE}(\text{Mel}(s)\|\text{Mel}(\hat{s})) \quad \text{<Equation 4>}$$

FIG. 5 shows the architecture of DCCRN for CNN layers. Size of data tensor are expressed as the size in samples and channels, while the shape of CNN kernels is expressed as the site of samples, input channels and output channels. For GRU layers, the additional dimension of the data tensors defines the length of the sequence (M=4). On the other hand, kernel sizes define a linear operation (input features, output features). The middle layer of each dense block, denoted as a dagger, has a large kernel size K1=55, with optional dilations 1, 2, 4, and 8 for the 4 dense blocks.

<Model Training Scheme>

According to the present invention, after training CNN components and RNN components, respectively, the combined network may be finely tuned.

CNN training: First, the speech processing method trains a CNN (DenseNet) component that minimizes errors $$\operatorname*{argmin}_{\mathbb{W}^{CNN}} \varepsilon(y\|\mathcal{D}(x; \mathbb{W}^{CNN})).$$

RNN training: the speech processing method trains the RNN part in many-to-one by minimizing the following $$\operatorname*{argmin}_{\mathbb{W}^{RNN}} \varepsilon(s\|\mathcal{G}(\overline{X}^{(L)}; \mathbb{W}^{RNN})),$$

and $\mathbb{W}^{CNN}$ is locked.

Integrative finetuning: Once the CNN and RNN are trained in advance, the speech processing method fixes the CNN parameter and performs fine tuning using the CNN component and the RNN component in order to minimize the final error $$\operatorname*{argmin}_{\mathbb{W}^{CNN}, \mathbb{W}^{RNN}} \varepsilon(s\|\mathcal{G}(\mathcal{D}(x; \mathbb{W}^{CNN}); \mathbb{W}^{RNN}).$$

The learning rate for integrated fine tuning may be reduced.

The speech processing method provides a dual-staged temporal context aggregation network having both a CNN component and an RNN component for modeling a time domain signal in an end-to-end form.

The speech processing method provides a dual-staged temporal context aggregation network having both a CNN component and an RNN component for end-to-end monaural speech enhancement.

The speech processing method provides an efficient heterogeneous model architecture that is dense and enhanced by cross-component residual connectivity.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The apparatus described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs: and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A speech processing method, comprising:
   inputting a time domain sample of N*1 dimension for an input speech into a densely connected hybrid network, N being an integer, greater than one;
   passing the time domain sample through a plurality of dense blocks in a densely connected hybrid network;
   reshaping the time domain samples into M subframes by passing the time domain samples through the plurality of dense blocks;
   inputting the M subframes into gated recurrent unit (GRU) components of N/M-dimension;
   outputting clean speech from which noise is removed from the input speech by passing the M subframes through GRU components
   wherein the densely connected hybrid network is combination a convolutional neural network (CNN) and a recurrent neural network (RNN).

2. The speech processing method of claim 1, wherein the densely connected hybrid network includes a plurality of dense blocks,
   wherein the each of the dense blocks comprise a plurality of convolutional layers.

3. The speech processing method of claim 1, wherein the time domain sample of the N*1 dimension is extended to convolution layers of the N*D dimension to the N*MD dimension, and each of the convolution layers of the N*D dimension to the N*MD dimension may be connected,
   wherein D is an expansion rate, and M is the number of convolutional layers constituting the dense block.

4. The speech processing method of claim 1, wherein each of the plurality of dense blocks included in the densely connected hybrid network is expressed as a repetitive neural network as having identical convolutional layers.

5. The speech processing method of claim 1, wherein the output of a last dense block of the densely connected hybrid network is reshaped into M subframes,
   wherein the M subframes are input to N/M-dimensional GRU components.

6. The speech processing method of claim 1, wherein each of the dense blocks outputs a data tensor in the form of a combination of features and channels by performing a 1D convolution operation.

7. The speech processing method of claim 1, wherein each of the dense blocks performs a 1D convolution operation or an extended convolution operation according to an expansion rate.

8. The speech processing method of claim 1, wherein the GRU components enhance speech in a form in which a first hidden state and a second hidden state are mixed by an update gate.

9. The speech processing method of claim 8, wherein the second hidden state is determined using a linear combination of an input of the GRU component and the first hidden state that is a gated previous hidden state.

10. A speech processing device comprising:
    a processor;
    wherein the processor is configured to:
      input a time domain sample of N*1 dimension for an input speech into a densely connected hybrid network, N being an integer greater than one;
      pass the time domain sample through a plurality of dense blocks in a densely connected hybrid network;
      reshape the time domain samples into M subframes by passing the time domain samples through the plurality of dense blocks;
      input the M subframes into gated recurrent unit (GRU) components of N/M-dimension;
      output clean speech from which noise is removed from the input
    speech by passing the M subframes through GRU components wherein the densely connected hybrid network is combination a convolutional neural network (CNN) and a recurrent neural network (RNN).

11. The speech processing device of claim 10, wherein the densely connected hybrid network includes a plurality of dense blocks,
    wherein the each of the dense blocks comprise a plurality of convolutional layers.

12. The speech processing device of claim 10, wherein the time domain sample of the N*1 dimension is extended to convolution layers of the N*D dimension to the N*MD dimension, and each of the convolution layers of the N*D dimension to the N*MD dimension may be connected,
    wherein D is an expansion rate, and M is the number of convolutional layers constituting the dense block.

13. The speech processing device of claim 10, wherein each of the plurality of dense blocks included in the densely connected hybrid network is expressed as a repetitive neural network as having identical convolutional layers.

14. The speech processing device of claim 10, wherein the output of a last dense block of the densely connected hybrid network is reshaped into M subframes,
    wherein the M subframes are input to N/M-dimensional GRU components.

15. The speech processing device of claim 10, wherein each of the dense blocks outputs a data tensor in the form of a combination of features and channels by performing a 1D convolution operation.

16. The speech processing device of claim 10, wherein each of the dense blocks performs a 1D convolution operation or an extended convolution operation according to an expansion rate.

17. The speech processing device of claim 10, wherein the GRU components enhance speech in a form in which a first hidden state and a second hidden state are mixed by an update gate.

18. The speech processing device of claim 17, wherein the second hidden state is determined using a linear combination of an input of the GRU component and the first hidden state that is a gated previous hidden state.

* * * * *